Jan. 20, 1948.  R. W. WUBBEN  2,434,826
AUTO TOP SKI CARRIER
Filed April 22, 1946
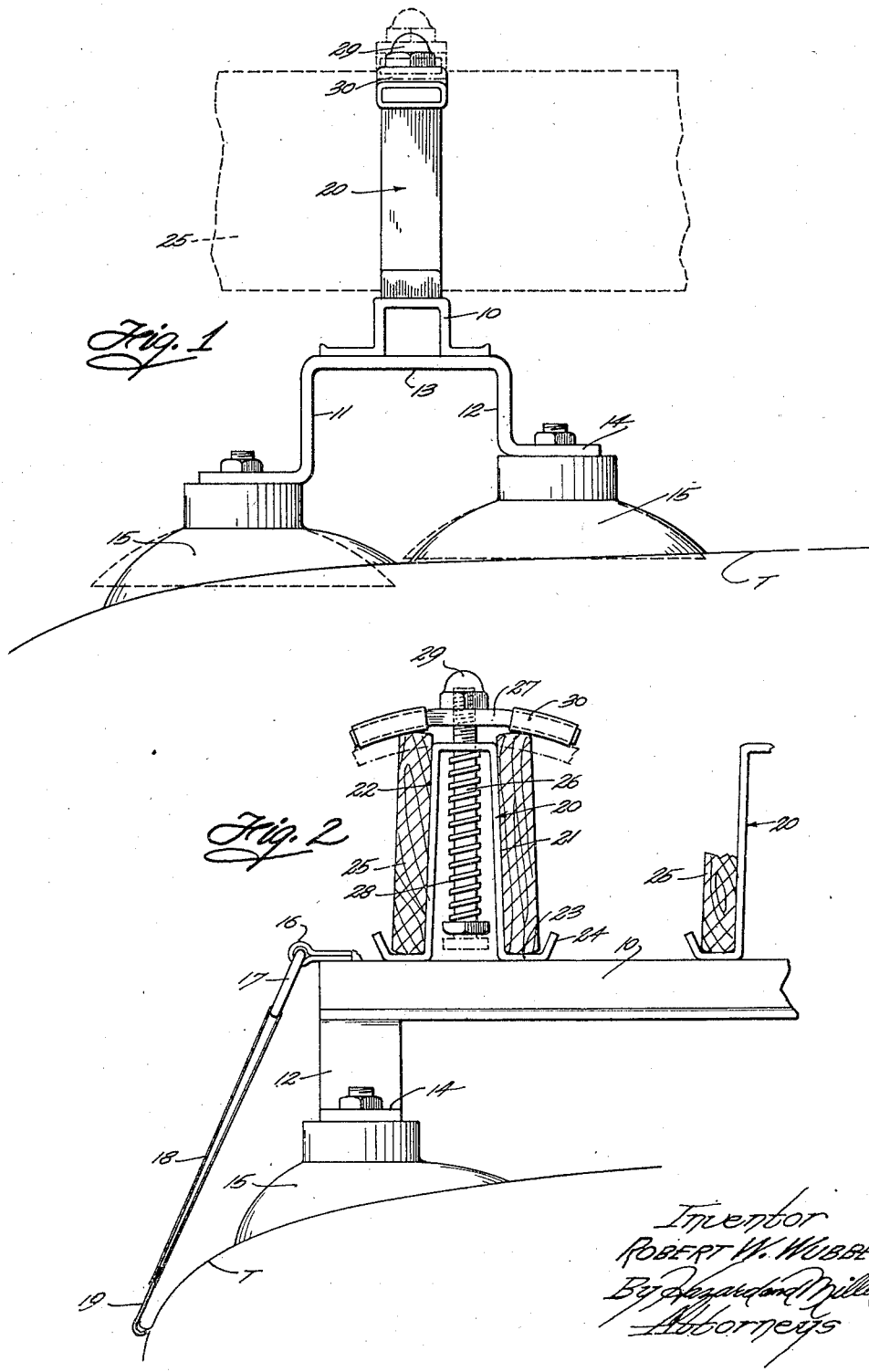

Patented Jan. 20, 1948

2,434,826

UNITED STATES PATENT OFFICE 2,434,826

AUTO TOP SKI CARRIER

Robert W. Wubben, Los Angeles, Calif.

Application April 22, 1946, Serial No. 664,127

5 Claims. (Cl. 224—29)

This invention relates to improvements in ski holders or ski clamps adapted to be mounted on the tops of automobiles.

An object of the invention is to provide an improved ski holder or ski clamp that can be readily applied to the top of an automobile and readily detached therefrom and which is so designed that a plurality of pairs of skis may be positioned thereon and retained in position during traveling.

More specifically, an object of the invention is to provide an improved ski holder or ski clamp consisting of a pair of transverse supports having legs adjacent their ends on which suction cups are mounted adapted to be applied to the top surface of an automobile, the transverse bar or support being equipped with a plurality of upstanding standards against the opposite sides of which skis of a pair may be positioned, and to provide means for yieldably clamping and retaining the skis in positions snugly bearing against the standards so that they cannot readily be displaced or loosen or rattle.

Another object of the invention is to provide an auto top ski carrier which is of relatively simple and durable construction and which can be economically manufactured and which can be applied to an automobile or detached therefrom, without danger of marring the finish of the automobile or requiring any alteration in the structure of the automobile.

With the foregoing and other objects in view, which will be made manifest in the following detailed description and specifically pointed out in the appended claims, reference is had to the accompanying drawings for an illustrative embodiment of the invention, wherein:

Figure 1 is a partial view in end elevation of one of the parts of the improved ski carrier; and Fig. 2 is a partial view in front elevation of the part of the ski carrier illustrated in Fig. 1.

Referring to the accompanying drawings wherein similar reference characters designate similar parts throughout, the improved ski carrier comprises a transversely extending bar or support 10. This bar or support may be of any suitable formation or material and as illustrated is in the form of an inverted channel having laterally extending flanges. The bar is adapted to be positioned so as to extend transversely across the top of the automobile it being understood that there are two of the devices illustrated applied to each automobile, one near the front of the top and the other near the rear of the top. However, as both constructions are identical only one is illustrated. The length of the bar is preferably slightly smaller than the width of the top so that the ski carrier does not project or overhang beyond the sides of the automobile.

At the ends of the bar there are suitable legs indicated at 11 and 12 connected by bridging pieces 13 that may be integral therewith and to which the ends of the bar or support 10 are welded, riveted, bolted or otherwise secured. The legs 11 and 12 preferably are of uneven length and have feet 14 at their lower ends to which vacuum cups 15 are secured. These vacuum cups present concave bottom surfaces and are preferably formed of highly flexible yieldable rubber so that when they are pressed firmly against the top surface of an automobile top T they will adhere thereto by the vacuum created in their cavities. The unequal lengths of the legs 11 and 12 so positions the vacuum cups in a longitudinal direction that they generally conform to the curvature of the top. When pressed against the top these vacuum cups are deformed to conform to the surface of the top.

At the ends of the bar or support 10 there may be secured such as by eyes 16 and rings 17, belts 18 and hooks 19. These hooks are arranged to engage beneath the conventional rain gutter that is usually present at the sides of the automobile top. While the use of these straps and hooks is optional they are preferably employed to afford additional security against the carrier loosening on the surface of the top T.

At regularly spaced intervals across the bar or support 10 there are secured in any suitable manner standards 20. These standards are preferably in the form of inverted U-shaped sections of strap metal having sides 21 and 22 with flanges or feet 23 at the bottoms thereof, the outer ends of which are bent upwardly as at 24.

The upwardly bent portions 24 are spaced from the sides 21 and 22 a distance approximately equal to the thickness of the conventional ski 25. A stem 26 slidably extends through the top of each standard and through a cross bar 27 that is disposed thereover. Surrounding the stem is a compression spring 28 that urges the stem downwardly. The cross bar 27 is retained on the stem such as by nut 29 and has its outer ends bent downwardly and preferably covered with resilient material such as rubber sleeves 30.

Each standard along the length of the support or bar 10 is similarly equipped with a stem, compression spring, and cross bar, there preferably being from four to six standards arranged along the length of the support 10 to accommodate a corresponding number of pairs of skis. The heights of the standards are slightly less than the widths of the skis so that when the skis are positioned edgewise on the feet 23, it is necessary to lift the cross bar 27 a short distance compressing the spring 28 to enable the skis to be positioned thereover. When the cross bar 27 is then released its ends are brought downwardly against the top edges of the skis and crowd the skis against the sides of the standard, thus retaining the skis firmly thereon and holding them against accidental displacement or rattling.

By having a ski carrier constructed as above described mounted on the top T adjacent the front and adjacent the back of the top each ski will be supported at each end over the top and will be clamped adjacent each end by the outer end of one of the cross bars 27.

It will be appreciated from the above-described construction that the bars 10 and their associated structure may be readily applied to the top of any conventional automobile and firmly anchored thereon by means of suction cups and the straps and hooks 18 and 19. The skis may be readily applied and clamped by the ski carrier in position and will be retained thereon during traveling. Whenever it is desired to remove the ski carrier this may be easily accomplished by disengaging the hooks 19 and loosening the suction cups.

Various changes may be made in the details of construction without departing from the spirit and scope of the invention as defined by the appended claims.

I claim:

1. A ski carrier comprising a bar or support adapted to be positioned transversely of a vehicle top, means for supporting the bar on the top adjacent its ends, said bar having one or more standards thereon, each standard comprising spaced legs against which skis of a pair may be positioned, means for retaining the lower edges of the skis adjacent the legs, and a spring-actuated cross bar on each standard adapted to be urged into engagement with the top edges of the skis to hold them adjacent the standard, the outer ends of the cross bars being bent downwardly and being resiliently covered.

2. A ski carrier comprising a transverse support, legs at the ends of the support, suction cups on the legs and one or more standards on the support, each standard being of inverted U-shaped form having legs against which the skis of a pair may be positioned, the legs having feet, the outer ends of which are bent upwardly to retain the lower edges of the skis adjacent the sides of the standard, a stem slidable through the top of the standard, a compression spring about the stem normally urging the stem downwardly, and a cross bar on the stem over the standard engageable with the top edges of skis positioned against the sides of the standard.

3. A ski carrier comprising a transverse support, legs at the ends of the support, suction cups on the legs and one or more standards on the support, each standard being of inverted U-shaped form having legs against which the skis of a pair may be positioned, the legs having feet, the outer ends of which are bent upwardly to retain the lower edges of the skis adjacent the sides of the standard, a stem slidable through the top of the standard, a compression spring about the stem normally urging the stem downwardly, and a cross bar on the stem over the standard engageable with the top edges of the skis positioned against the sides of the standard, the outer ends of the cross bar being bent downwardly and being resilient covered.

4. A ski carrier comprising a transverse support, legs at the ends of the support, suction cups on the legs and one or more standards on the support, each standard being of inverted U-shaped form having legs against which the skis of a pair may be positioned, the legs having feet, the outer ends of which are bent upwardly to retain the lower edges of the skis adjacent the sides of the standard, a stem slidable through the top of the standard, a compression spring about the stem normally urging the stem downwardly, a cross bar on the stem over the standard engageable with the top edges of the skis positioned against the sides of the standard, and hooks and straps secured to the ends of the bar adapted to engage the rain gutter of the top of the automobile.

5. A ski carrier comprising a transverse support, means for mounting the support on the roof of an automobile or the like so as to extend thereacross, and one or more upstanding standards on the support against the sides of which skis of a pair may be positioned on edge, means for holding the lower edges of the skis against outward displacement, a cross bar on each standard extending in the direction of the length of the support and engageable with the upper edges of the skis, and spring means disposed within the support for urging the cross bar downwardly into engagement with the top edges of the skis.

ROBERT W. WUBBEN.

REFERENCES CITED

The following references are of record in the file of this patent:

UNITED STATES PATENTS

| Number | Name | Date |
|---|---|---|
| 2,235,012 | Colvin | Mar. 18, 1941 |
| 2,315,387 | Bambenek et al. | Mar. 30, 1943 |

FOREIGN PATENTS

| Number | Country | Date |
|---|---|---|
| 173,588 | Switzerland | Feb. 16, 1935 |
| 189,352 | Switzerland | May 1, 1937 |
| 100,412 | Sweden | Dec. 3, 1940 |